United States Patent [19]

Charransol et al.

[11] 4,001,781
[45] Jan. 4, 1977

[54] ELECTRONIC SWITCHING ELEMENT

[75] Inventors: Pierre Charransol; Jacques Hauri, both of Paris; Serge Robert Fontana, Elancourt, all of France

[73] Assignee: International Standard and Electric Corporation, New York, N.Y.

[22] Filed: Feb. 18, 1975

[21] Appl. No.: 550,604

[52] U.S. Cl. .................. 340/147 C; 179/18 GF
[51] Int. Cl.² ................ H04Q 3/60; H04J 3/16
[58] Field of Search ............... 340/147 C, 166 R; 179/15 AQ, 18 GF

[56] References Cited

UNITED STATES PATENTS

| | | | |
|---|---|---|---|
| 3,678,205 | 7/1972 | Cohen et al. | 340/166 R X |
| 3,694,580 | 9/1972 | Inose et al. | 340/166 R X |
| 3,792,200 | 2/1974 | Altenburger | 340/166 R X |
| 3,818,142 | 6/1974 | Edstrom et al. | 179/15 AQ X |
| 3,859,467 | 1/1975 | Borgstrom et al. | 340/166 R X |

*Primary Examiner*—Donald J. Yusko
*Attorney, Agent, or Firm*—J. B. Raden; M. M. Chaban

[57] ABSTRACT

A space division switching network having a plurality of stages is disclosed for use as part of a time-space-time division switching system. The network employs MOS technology with standard printed circuit boards enabling very compact assembly. To enable a maximum number of stages to be placed on a standard board with appropriate electrical connections to each stage over the standard number of terminals, addresses of crosspoints are supplied in parallel over common address conductors and the appropriate stage is then switched through an enable signal.

4 Claims, 6 Drawing Figures

4,001,781

ELECTRONIC SWITCHING ELEMENT

BACKGROUND OF THE INVENTION

1. Field of the Invention

The present invention concerns an electronic switching element or component having at least two stages. It can be employed in coded signal time switching systems and, more particularly, in telephone exchanges involving time division switching of signals which have been subjected to pulse code modulation.

2. Description of the Prior Art

At the inputs of such an exchange, the signals originating from busy lines are sampled at 8 kHz and each sample is translated into a coded combination of eight binary signals (bits). Each combination is transmitted in series over a conductor, within a very short time slot constituting a time channel. It is thus possible to time multiplex 32 channels for instance. The period of recurrence of the successive combinations of a channel is 125 micro seconds, whereas the time slot provided for each channel lasts about 4 micro seconds. An incoming multiplex group routes the signals originating from 32 lines. A similar outgoing multiplex group routes the signals intended to these same 32 lines.

Inside the exchange, there will be generally many incoming and outgoing multiplex groups. It is necessary that any coded combination appearing on a time channel of a multiplex group may be retransmitted over any time channel of any multiplex group. This involves space (connections from group to group) and time (connections from channel to channel) switching operations. These will be performed by means of a network including space switches and memories This network may be, for instance, of a well-known time-space-time type.

In a simplified embodiment, this network will include an incoming memory with 32 cells for each incoming 32-channel group and an outgoing memory with 32 cells for each outgoing 32-channel group. The incoming memories will be connected to the outgoing 32-channel group. The incoming memories will be connected to the outgoing memories through a connection network enabling each incoming memory to have access to each outgoing memory.

A connection between an incoming channel of an incoming group and an outgoing channel of an outgoing group thus uses a cell allocated to the incoming channel in the incoming memory assigned to the incoming group, a connection path between this incoming memory and the outgoing memory assigned to the outgoing group and a cell of this outgoing memory allocated to the outgoing channel. At the time assigned to the incoming channel, a coded combination, received in series on the incoming group, is recorded in the incoming memory cell. During the channel time selected for the considered connection, the connection path is established between the incoming memory and the outgoing memory, the incoming memory cell is read and the combination which it contains is routed, in series, through the connection path, up to the outgoing memory; there, it is recorded in the memory cell of the outgoing channel. Finally, at the channel time assigned to the outgoing channel, the outgoing memory cell is read and the coded combination which it contains is transmitted in series over the outgoing group.

The network connecting the incoming memories to the outgoing memories must consequently be able to provide, at each channel time, as many connection paths as there are incoming (or outgoing) memories. It will be necessarily electronic because of the required speed and it is obviously to be desired that it may be compact, which contributes to the operating speed, but also it may have a small dissipation of heat, which allows better compactness and, of course, its price must be as low as possible.

In accordance with the requirements set forth above, it is suggested that this network be assembled as a group of switching modules mounted on printed circuit boards. The French Pat. No. 71 43195 filed on Dec. 2, 1971 (corresponding to U.S. patent application Ser. No. 308,295 filed Nov. 20, 1972 now U.S. Pat. No. 3,865,989 and assigned to International Standard Electric Company) in the name of Compagnie Generale de Constructions Telephoniques for "Module de commutation electronique" (electronic switching module) describes such a module constructed in the shape of an integrated circuit in M.O.S. (metal - oxyde - semi-conductor) technology and which constitutes a connection matrix with eight inputs and eight outputs. Many modules of this type can be mounted on a medium sized board. However, a problem occurs because of the limited number of the input and output connections of the board.

Indeed, printed circuit boards are generally provided with connectors offering a limited number of connection points. In other respects, each switching module comprises eight inputs which must be connected to incoming memories or eight outputs which must be connected to outgoing memories, and at least eight address inputs to control the connections, say at least 16 circuits to be extended out of the board. As the connectors now available enable only the use of two hundred connection points, it is noted that it has not been practical to mount more than 10 modules on a board which could otherwise support a much larger number of these modules.

Thus, equipment limitations which can seem to be of minor importance result in a considerable reduction in connection network compactness and, consequently, in its operating speed.

SUMMARY OF THE INVENTION

The present invention enables an appreciable reduction in the effects of the described limitations, to such an extent that they stop being critical limitations and concerns an arrangement of switching modules and of their control circuits constituting a two stage switching network, or element, provided to be mounted on only one board, the number of modules fixed on the board being relatively large.

The electronic switching element of the present invention includes, more particularly, $m$ switching modules each comprising $n$ first accesses which will be called outputs, $p$ second accesses which will be called inputs, $n \times p$ switching circuits enabling the connection of each of $n$ outputs to any one of $p$ inputs, $n$ address inputs each of which is provided to receive a coded address providing the identity of an input to be connected to the output with which it is associated, at least a recording impulse input and an input for impulses enabling the use of these addresses (enabling impulses). This element is characterized in this that with a group of $m$ modules are associated $n$ address sources, each of them being connected in parallel to an address input of each of the modules of the group and providing cyclically addresses for these modules and a clock applying cyclically series of impulses to these $m$ modules, so that each module, in its turn records $n$ addresses, then an enabling impulse, so that $m$ modules use together the addresses which they have successively recorded, such an arrangement limiting the number of conductors to be provided between the address sources and the modules with a view to placing the address sources off the board.

BRIEF DESCRIPTION OF THE DRAWINGS

Additional objects and features of the invention will become more apparent from the following description of a preferred embodiment thereof, taken in conjunction with the accompanying drawings, wherein.

DESCRIPTION OF PREFERRED EMBODIMENTS

Figure 1:
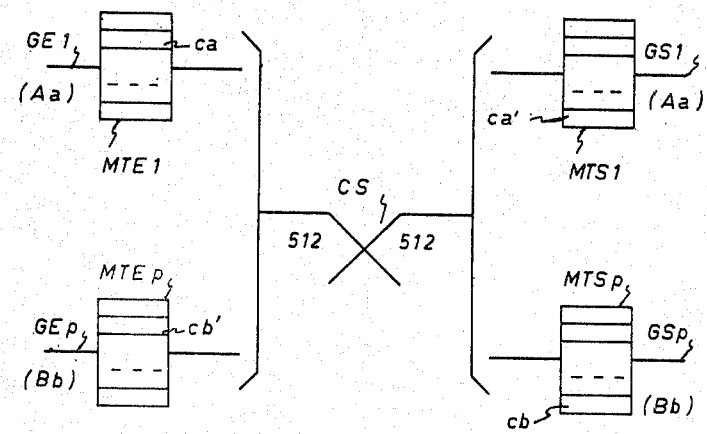
FIG. 1 is a block diagram of a time division switching network in which the present invention can be applied.

With reference to FIG. 1, first there will be described block diagrams of circuits of a switching network in accordance with an application of the invention.

This network includes incoming multiplex groups such as GE1. To each of them corresponds an outgoing multiplex group such as GS1. These multiplex groups comprise, each, for instance, 32 time channels. To each time channel corresponds a channel time slot or, more simply, a channel time of about 4 micro seconds in which is transmitted in series a coded combination of 8 bits. The same channel time is repeated every 125 micro seconds. An incoming call memory MTE1 associated with multiplex group GE1 and an incoming call memory MTEp associated with an incoming multiplex group GEp are also represented in FIG. 1. In the same way, outgoing call memories MTS1 and MTSp are associated with outgoing multiplex groups GS1 and GSp. These memories comprise each 32 cells. The incoming memories are connected to the outgoing memories through a connection network CS enabling each incoming memory to have access to each outgoing memory.

The case of a call between a subscriber ($Aa$) to whom corresponds the channel time $ti$ on incoming and outgoing groups GE1 and GS1, and another subscriber ($Bb$) to whom corresponds channel time $tb$ on incoming and outgoing groups GEp and GSp is considered.

At channel time $ta$, a coded combination, received in series on multiplex group GE1, is recorded in a cell $ca$ allocated to the incoming channel in incoming memory MTE1. During a channel time $tx$ selected for the connection between this incoming memory and outgoing memory MTSp allocated to outgoing group GSp, the connection path is established between these two memories. Memory cell $ca$ is read and the coded combination which it contains is routed through the connection path up to outgoing memory MTSp; there, it is recorded in memory cell $cb$ allocated to the outgoing channel. Later, at channel time $tb$ assigned to the outgoing channel, outgoing memory cell $cb$ is read and the combination it contains is transmitted in series onto outgoing group GSp.

Symmetrically, the connection in the opposite direction, between the outgoing channel of a first line ($Aa$) and the incoming channel of a second line ($Bb$) is established in the same way and uses memory cells $ca'$ and $cb'$ of outgoing and incoming memories MTS1 and MTEp and a connection path established at channel time $tx$ or at any other suitable channel time.

It will be noted, finally, that the considered call between two subscribers requires the use, more particularly, of cells $ca$ and $cb$, $ca'$ and $cb'$ of memories MTE1, MTSp and MTS1, MTEp and two connection paths. These paths are established by connection network CS. This network must be able to provide, at each channel time, as many connection paths as there are incoming or outgoing memories. Thus, according to the chosen example, connection network CS comprises 512 inputs which can be each connected to any one of 512 outputs. It has been illustrated in the shape of a simple connection matrix 512 × 512 which can obviously provide 512 paths at a time. Such a solution would be excessively expensive.

Figure 2:
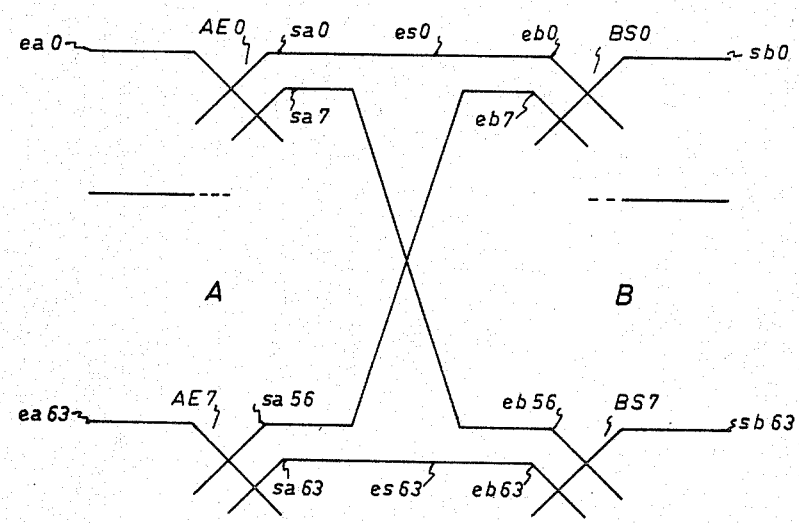
FIG. 2 shows the basic element of switching network CS of FIG. 1.

It is proposed, in order to construct such a network, to use as a basic element, according to the invention, a switching element the diagram of which is represented in FIG. 2.

The selection element of FIG. 2 includes, more particularly, two stages A and B.

Stage A includes 8 switching matrices AE0, . . . , AE7 including eight inputs each, such as $ea0$ and eight outputs such as $sa0$. In the same way, stage B includes eight switching matrices BS0, . . . , BS7 including each eight inputs such as $eb0$ and eight outputs such as $sb0$. The output of rank $m$ of a matrix of rank $p$ of Stage A is connected to the input of rank $p$ of the matrix of rank $m$ of stage B. Thus, output $sa0$ of rank 0 of matrix AE0 is connected to input $eb0$ of matrix BS0. In the same way, the output of rank 0 of matrix AE7, $sa56$, is connected to the input $eb7$ of rank 7 of matrix BS0. Each of 64 outputs $sa0$ to $sa63$ of stage A is connected to one of the 64 inputs $eb0$ to $eb63$ of stage B through one of the 64 links $es0$ to $es63$.

The two stage switching element of FIG. 2 includes 64 inputs and 64 outputs. To control the verticals, for instance, at least one address conductor also must be provided per vertical, consequently, according to the chosen example, 64 address conductors per stage. Such a two stage switching element would, consequently, require more than two hundred connection points. This is not feasible under present conditions of the relevant technology, as the connectors now available, as previously noted, enable using only about two hundred connection points.

The present invention concerns an arrangement of switching modules and of their control circuits constituting a switching element provided to be mounted on only one board in which the previous limitations have been eliminated.

Figure 3:
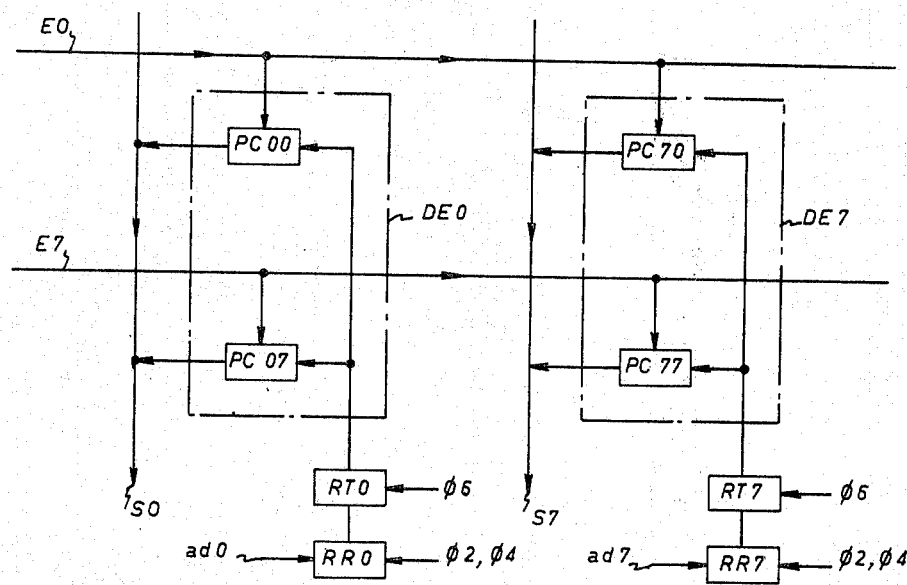
FIG. 3 is a block diagram of the circuits of a known switching module used in the network of the present invention.

To enable a better understanding of the invention which will be described subsequently in connection with FIG. 4, a switching module used in the present invention will be now described. This module, the circuit diagram of which is illustrated in FIG. 3 forms the subject of French Pat. No. 71 43195 (U.S. application Ser. No. 308,295) previously mentioned.

The module of FIG. 3 includes more particularly, eight inputs E0 to E7, eight outputs S0 to S7 and eight switching circuits DE0 to DE7, each of the latter including eight crosspoints PC00 to PC07, PC70 to PC77. To simplify the figure, only the first and the second inputs, the first and the second outputs and the corresponding switching circuits have been represented.

If it is supposed that circuit PC00 which can be single gate, is made conducting, input E0 is connected to output S0. If only one of the gates associated with output S0 can be made selectively conducting, any one of inputs E0 to E7 is selectively connected to this output S0. If the same switching is performed independently for each of the outputs, the module will enable the establishment of a connection for each output with any one of the inputs.

With output S0 there are also associated an address conductor $ad0$ provided for the reception of a three bit address, transmitted in series and designating an input to which must be connected the output, a reception register RR0 receiving three bits in series and providing them as outputs in parallel, and a buffer register RT0 receiving the three bits provided in parallel by register RR0 and storing them afterwards, so that register RR0 may be released to receive a new address.

Output S7 is provided, in the same way, with registers RR7 and RT7 for the reception of an address provided on an address conductor $ad7$. So it is for the other outputs not represented.

The operation of this module will be described now with reference to curves $\phi2$, $\phi4$ and $\phi6$ of FIG. 5, although these illustrate more specially the operation of the circuits of FIG. 4.

The first bit AD00 of an address AD0, for instance, is received on register RR0 during a phase $\phi2$. It is recorded. The second bit AD01 is received in a phase $\phi4$, whereas the first steps forward in the register. At last, the third bit AD02 is received in a second phase $\phi2$. Following a time slot which will not be stated precisely, at this stage of the description, a phase signal $\phi6$ is provided. This signal causes the transfer of the address of register RR0 to register RT0. From that time, the address is transmitted through register RT0 to switching circuit DE0. It is decoded and makes a crosspoint PC00 conductive, for instance. Input E0 is connected to output S0. The eight bits of a coded combination received in series on input E0 can be then transmitted onto output S0. In the meantime, register RR0 is available to receive a new address. At the next phase signal $\phi6$, this new address will be communicated to switching circuit DE0 to establish another connection for routing, on output S0, the following coded combination.

So it is for each of outputs S0 to S7.

There will be described now, with reference to FIG. 4, an embodiment of the switching element designed according to the present invention, in harmony with the general diagram of FIG. 2 and with the module of FIG. 3.

Figure 4:
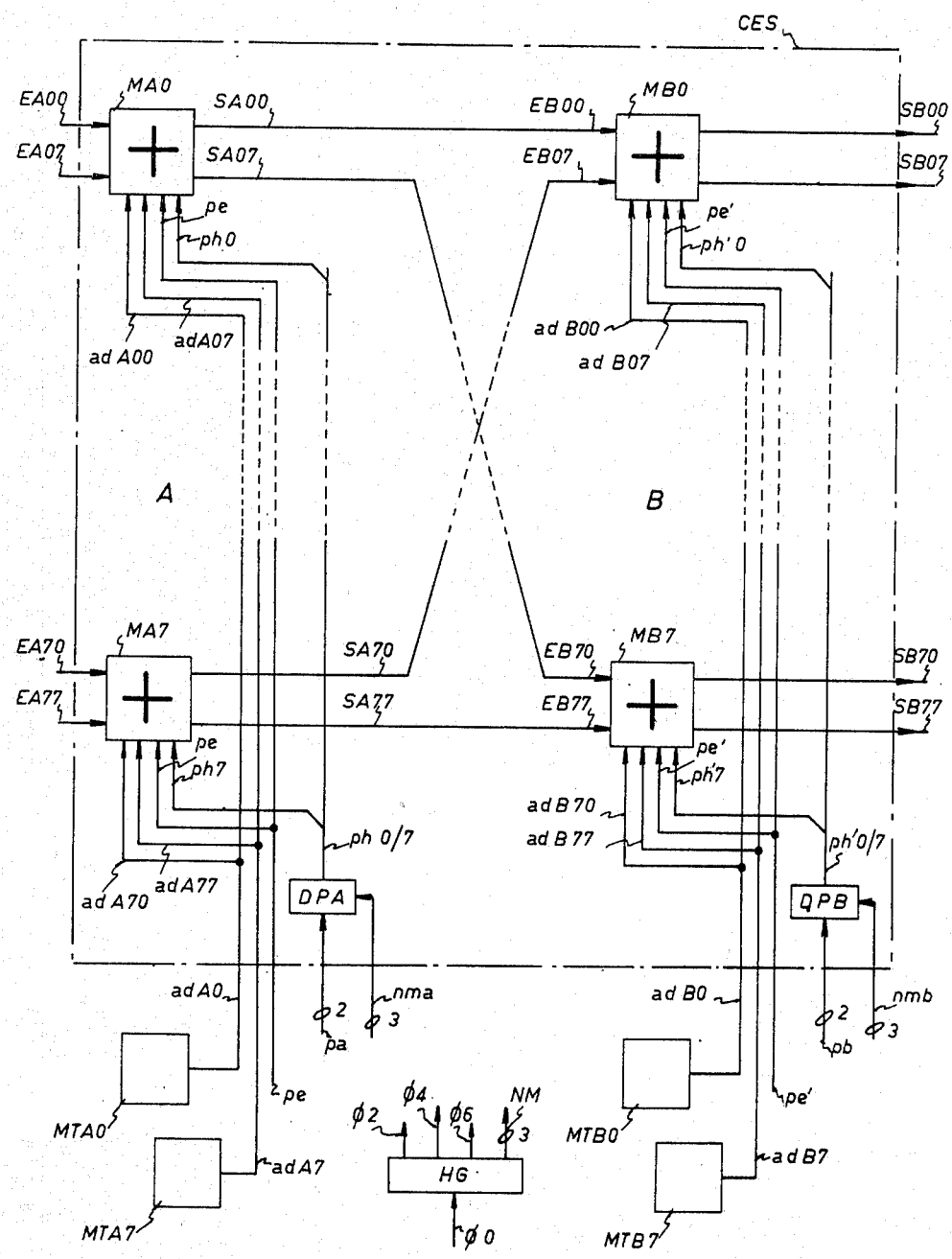
FIG. 4 is an embodiment of a two stage selection element according to the present invention.

To each matrix such as AE0 of FIG. 2, there corresponds in the switching element of FIG. 4, a module identical with that of FIG. 3. Thus, the switching element of FIG. 4 comprises, more particularly, two stages A and B made up respectively of the eight modules, MA0 to MA7 and MB0 to MB7, each identical with the module previously described. To simplify the figure, only the first and the last modules of each stage and, for each of them, the first and last input, output and address conductors have been represented.

Thus, for stage A, module MA0, its inputs EA00 and EA07, its outputs SA00 and SA07 and its address conductors $adA00$ and $adA07$ and module MA7, its inputs EA70 and EA77, its outputs SA70 and SA77 and its address conductors $adA70$ and $AdA77$ have been represented.

For stage B, module MB0, its inputs EB00 and EB07, its outputs SB00 and SB07 and its address conductors $adB00$ and $adB07$, and module MB7, its inputs EB70 and EB77, its outputs SB70 and SB77 and its address conductors $adB70$ and $adB77$ have been represented.

Successive inputs EB00 to EB07 of module MB0 of rank 0 of stage B are connected respectively to outputs SA00 to SA70 of Rank 0 of modules MA0 to MA7 of stage A and so on. The successive inputs EB70 to EB77 of module MB7 of rank 7 of stage B are connected to the outputs SA07 to SA77 of rank 7 of the successive modules of stage A.

Reciprocally, the successive outputs SA00 to SA07 of module MA0 of rank 0 of stage A are respectively connected to the inputs of rank 0 EB00 to EB70 of modules MB0 to MB7, the successive outputs SA70 to SA77 of module MA7 of rank 7 being respectively connected to the inputs EB07 to EB77 of rank 7 of the successive modules of stage B.

It is provided to fasten this switching element with a number of similar elements on a single board CES. This board includes also two demultiplexers DPA and DPB. Demultiplexer DPA provides phase signals, on its output conductors $ph0/7$, which are transmitted to the modules of stage A. Thus, module MA0 receives these signals on two phase signal conductors $ph0$ and so on, with module MA7 receiving these signals on its two conductors $ph7$. In the same way, demultiplexer DPB applies phase signals to modules MB0 ... MB7 of stage B through the respective sets of two conductors $ph'0$ ... $ph'7$.

Control impulses are also applied to the modules of stage A on a conductor $pe$ and control impulses are applied to the modules of stage B on a conductor $pe'$.

Figure 5:
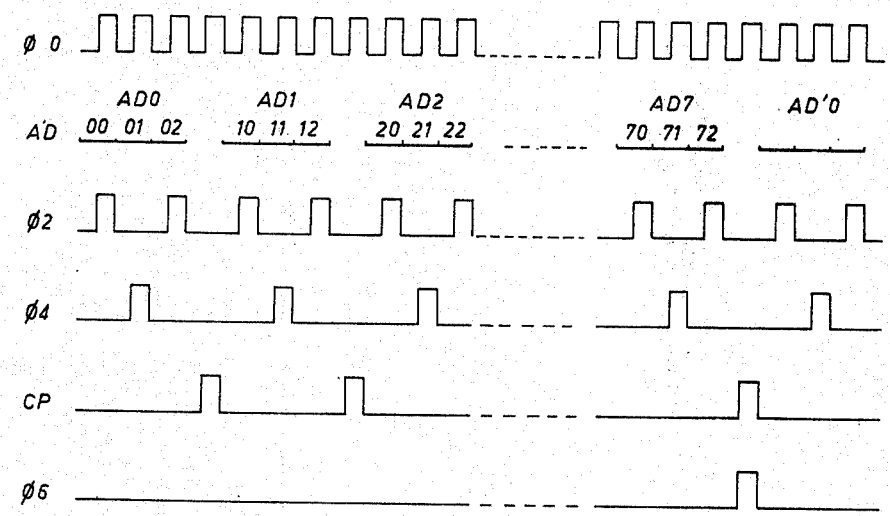
FIG. 5 shows curves illustrating the operation of different components of the switching element of FIG. 4.

Clock HG which is a sort of counter, is controlled by impulses $\phi0$ and provides phase signals $\phi2$, $\phi4$ and $\phi6$ illustrated by the curves of FIG. 5 and a coded signal of three bits NM.

Memories MTA0 to MTA7, under the influence of control signals not represented, each provide eight successive addresses per channel time in series on a conductor $adA0$ to $adA7$ towards the modules of stage A. In the same way, memories MTB0 to MTB7 each provide eight successive addresses per channel time in series on a conductor $adB0$ to $adB7$ towards the modules of stage B.

Board CES includes, consequently, 64 input conductors EA00 to EA77, 64 output conductors SB00 to SB77, eight address conductors per stage instead of the 64 conductors per stage previously necessary and, per stage, 3 conductors $nma$ or $nmb$, to transmit the three bit coded signal NM to demultiplexer DPA or DPB associated with this stage, two conductors $pa$ or $pb$ to transmit phase signals $\phi2$ to $\phi4$ to these demultiplexers and a conductor $pe$ or $pe'$ common to the modules of a stage.

The operation of the selection element of FIG. 4 will be described in further detail with reference to the curves of FIG. 5.

FIG. 5 represents signals $\phi0$, $\phi2$, $\phi4$, $\phi6$, CP and AD.

Signals $\phi0$ are clock pulses provided by a central clock, not represented. Signals CP are impulses peculiar to clock HG. They have been represented in FIG. 5 to illustrate the changes of value of signal NM. Curve AD represents groups of address signals AD0, AD1, AD2 . . . AD7 and AD'0 transmitted onto address conductor $ad$A0.

The transmission of bits AD00, AD01 and AD02 constituting address AD0 provided by path memory MTA0 on conductor $ad$0 will be first considered. It is assumed that counter HG is at zero. The coded combination with three bits is 000. According to the chosen example, address AD0 designates the input of module MA0 to be connected to output SA00 of this module. It is transmitted to each module of stage A on address conductors $ad$A00 to $ad$A70, which are all connected in parallel to conductor $ad$A0.

To three bits of this address corresponds a series of phase signals $\phi2$, $\phi4$ and $\phi2$ of clock HG applied to demultiplexer DPA. The latter, controlled by signal NM, provides these impulses on conductors $ph$0 towards module MA0. As this module is thus the only one to receive phase signals $\phi2$, $\phi4$ and $\phi2$ address AD0 is only written in register RR0 of this module. Simultaneously, the seven only path memories such as MTA7, provide each the three bits of a coded combination on the conductors such as $ad$A7 towards the modules of stage A. For the same reason as previously, these addresses are recorded only in the address registers associated with the outputs of module MA0 which alone receives phase signals $\phi2$, $\phi4$ and $\phi2$.

After an idle time, the fourth clock impulse $\phi3$ gives rise, in clock HG, to an impulse CP, which increases by one unit combination NM which becomes 001.

Then, when the next impulses $\phi0$ from the central clock appear, memory MTA0 provides over conductor $ad$A0 the three bits Ad10, AD11, and AD12 of address AD1 to which corresponds a series of phase signals $\phi2$, $\phi4$ and $\phi2$. These signals are applied to module MA1 (not represented) through demultiplexer DPA controlled by coded signal NM. Address AD1 is consequently written only in address register RR0 of this module. Simultaneously and in the same way, the addresses provided by the other path memories associated with stage A are recorded in the other address registers of module MA1.

After a new idle time, a second impulse CP is produced. Signal NM is increased by one unit. The three bits AD20, AD21 and AD22 of address AD2 provided by memory MTA0 on conductor $ad$A0 are recorded in module MA2 (not represented) on stage A which alone receives phase signals $\phi2$, $\phi4$ and $\phi2$.

Thus, memory MTA0 provides eight successive addresses in series on address conductor $ad$A0. Simultaneously, the seven other path memories such as MTA7 provide each eight successive addresses in series on an address conductor such as $ad$17. To three bits of each of these addresses corresponds a series of phase signals $\phi2$, $\phi4$ and $\phi2$. To each of these addresses corresponds a value of signal NM. The series of phase signals are applied successively to modules MA0 to MA7 by demultiplexer DPA, controlled by signal NM. The module which receives a series of signals $\phi2$, $\phi4$ and $\phi2$ sees entered respectively the eight addresses provided simultaneously by the eight path memories MTA0 to MTA7 in its eight registers RR0 to RR7. So it is successively for the other modules.

Then, clock HG provides a phase signal $\phi6$ which is transmitted onto conductor $pe$. All the modules MA0 to MA7 receive this phase signal which enables, as previously noted, the use of the addresses written in the address registers. The desired connections between the different outputs and inputs of the modules of stage A are then established. The eight bits of each coded combination transmitted in series onto the inputs of modules MA0 to MA7 are routed towards the suitable outputs of these modules.

During this transmission in series of eight bits, each path memory such as MTA0 provides again eight successive addresses in series on the eight address conductors of homologous rank such as $ad$A00 . . . $ad$A70 of the eight modules of stage A. At the beginning of the next channel time, a phase signal $\phi6$ is applied to all the modules. The desired connections through stage A are established and the eight bits of each coded combination provided at one input of this stage are routed towards the suitable output. Simultaneously, the addresses for routing each of the combinations to be transmitted at the next channel time are provided for the eight modules MA0 to MA7.

Thus, to provide the addresses at eight outputs of each of the modules MA0 to MA7, it suffices to provide, in addition to conductors $pe$, $pa$ and $nma$, eight address conductors $ad$A0 to $ad$A7 instead of 64 conductors previously mentioned.

The operation of the different modules of stage B and associated control means is identical with the operation of the modules of stage A and control means which has just been described.

Thus, path memory MTB0 provides successively eight addresses on conductor $ad$B0 during a channel time slot. Phase signals $\phi2$ and $\phi4$ provided on conductors $pb$ are distributed successively to eight modules MB0 to MB7 by demultiplexer DPB, controlled by signal NM provided on conductors $nmb$.

Simultaneously, each of the seven path memories such as MTB7 provides successively eight addresses on a conductor such as $ad$B7.

Each module thus receives eight addresses, each of which enables associating with each of its eight outputs one of its eight inputs. At the beginning of the next channel time, a phase signal $\phi6$ is applied to all the modules MB0 to MB7 of stage B. The desired connections through stage B are established and the eight bits of each coded combination provided at one input of this stage are routed towards the suitable output. Simultaneously, the address for routing each of the combinations to be transmitted at the next channel time are sent to the eight modules MB0 to MB7.

To simplify, it has been supposed that phase signals $\phi2$, $\phi4$ and $\phi6$ and signal NM conditioning the operation of the elements of stage B were identical with respectively phase signals $\phi2$, $\phi4$ and $\phi6$ and signal NM conditioning the operation of the elements of stage A. This supposes that the two stages operate in synchronism. If the transmission time of the coded combination bits through stage A is to be taken into account, different impulses $\phi'2$, $\phi'4$ and $\phi'6$ obtained from a second clock HG' shifted with respect to the first one can be applied to stage B.

The selection element of FIG. 4 is consequently an element with 64 inputs and 64 outputs which for the sake of the addressing requires only 14 connections per stage with the outside of the board. Thus, it can be planned to arrange on only one board a switching element having up to three stages. Indeed, the insertion of an additional stage increases the number of crosspoints with outside connection by only the 14 connections required for the addressing. Under these conditions, for a three stage switching element arranged on only one board, the number of output conductors would be equal to 64+64+ 3×14 i.e. 170. As the connectors now available enable using about 200 connection points, more than 20 available points remain free to provide the board with the different necessary supply voltages.

Figure 6:
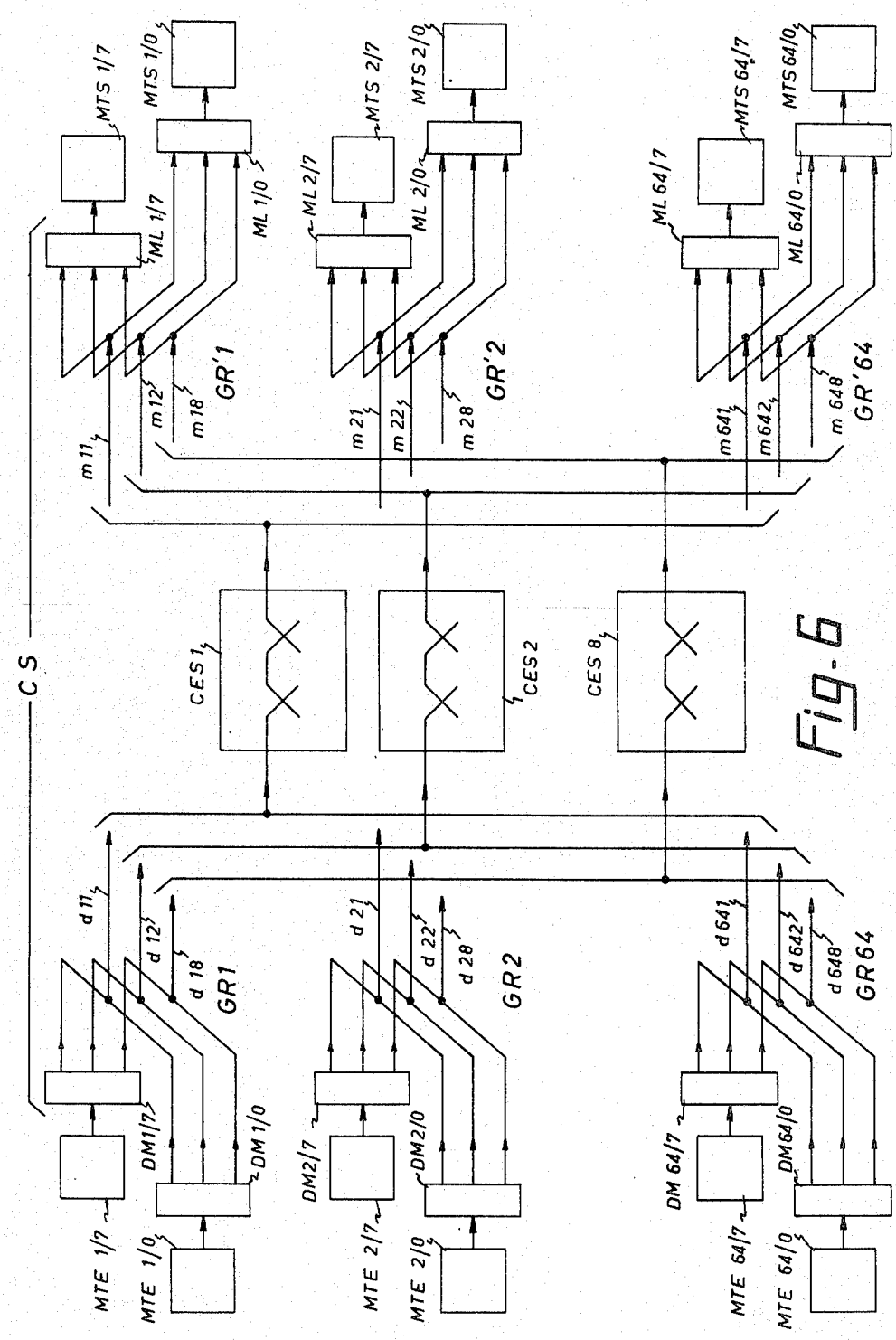
FIG. 6 illustrates a block diagram of a switching network in which is used the switching element of the present invention.

An embodiment of a switching network in which the selection element forming the subject of the present invention is used will be described now with reference to FIG. 6.

It was noted, in the example previously chosen (FIG. 1) that each multiplex group comprises 32 time channels. In the network of FIG. 6, provided for 16384 channels in 512 groups, can be found, more particularly, 512 incoming call memories, 512 outgoing call memories and a connection network CS.

The 512 incoming call memories are distributed in 64 groups of 8 memories. Thus, the group of rank 1, GR1, includes 8 memories MTE1/0 to MTE1/7, the group of rank 2, GR2, includes 8 memories MTE2/0 to MTE2/7 and so on, the group of rank 64, GR64, including eight memories MTE64/0 to MTE64/7. To the output of each of these memories is connected the input of a demultiplexer with one input and eight outputs. Thus, to the outputs of memories MET1/0 to MTE1/7 are connected respectively the inputs of the demultiplexers DM1/0 to DM1/7, to the outputs of the memories MTE2/0 to MTE2/7 are connected respectively the inputs of the demultiplexers DM2/0 to DM2/7 and so on. The inputs of demultiplexers DM64/0 to DM64/7 are respectively connected to the outputs of memories MTE64/0 to MTE64/7. The homologous outputs of the eight demultiplexers of the same group are multipled. Thus, the outputs of rank 1 of demultiplexers DM1/0 to DM1/7 are multipled and connected to an output conductor $d11$, the outputs of rank 2 of these same demultiplexers are multipled and connected to an output conductor $d12$, the outputs of rank 8 being multipled and connected to an output conductor $d18$.

In the same way, the outputs of ranks 1, 2 . . . 8 of demultiplexers DM2/0 . . . DM2/7 to DM64/0 . . . DM64/7 are respectively multipled and connected to output conductors $d21$, $d22$ . . . $d28$ to $d641$, $d642$ . . . $d648$. These different output conductors are connected to the inputs of connection network CS.

Connection network CS is made up of eight boards of switching elements CES1, CES2 . . . CES8 each of which is identical with board CES of FIG. 4. The 64 inputs of board CES1 are respectively connected to output conductors $d11$, $d21$ . . . $d641$ of demultiplexers DM1/0 to DM64/7.

In the same way, the 64 inputs of board CES2 are respectively connected to output conductors $d12$, $d22$ . . . $d642$ and so on, the 64 inputs of board CES8 being respectively connected to output conductors $d18$, $d28$ . . . $d648$.

The outputs of connection network CS are connected to the inputs of 64 groups GR'1 to GR'64 of eight multiplexers with eight inputs and one output ML1/0 to ML1/7, ML2/0 to ML2/7 . . . ML64/0 to ML64/7. The homologous inputs of the multiplexers of the same group are multipled. Besides, the output of rank $f$ of a board of rank $k$ of network CS is connected to the multipled inputs of rank $k$ of the multiplexers of the group of rank $f$. Thus, the respective outputs $m11$, $m12$ . . . $m18$ of rank 1 of boards CES1, CES2 . . . CES8 are respectively connected to the multipled inputs of ranks 1, 2 . . . 8 of multiplexers ML1/0 to ML1/7 of group GR'1 of rank 1, the outputs of rank 2 i.e. $m21$, $m22$ . . . $m28$ of these same boards are respectively connected to the multiplex inputs of ranks 1, 2 . . . 8 of multiplexers ML2/0 to ML2/7 of group GR'2 of rank 2 and so on, the outputs $m641$, $m642$ . . . $m648$ of rank 64 of these boards being respectively connected to the inputs of ranks 1, 2 . . . 8 of multiplexers ML64/0 to ML64/7 of group GR'8 of rank 8.

At least, the output of each multiplexer is connected to an outgoing call store MTS1/0 to MTS1/7, MTS2/0 to MTS2/7, MTS64/0 to MTS64/7.

At each channel time, a coded combination, received in series on each of the 512 multiplex groups with 32 channels, not represented, is recorded in the corresponding incoming memory cell.

At the first channel time, demultiplexers DM1/0 to DM1/7 take a determined direction, different from one demultiplexer to another. The coded combination provided in series by memory MTE1/0 and received by demultiplexer DM1/0 is thus routed over output conductor $d18$, for instance, towards the board of switching elements CES8. Simultaneously, the coded combination provided in series by memory MTE1/7 and received by demultiplexer DM1/7 is routed over output conductor $d11$, for instance, towards the board of switching elements CES1.

The coded combination originating from memory MTE1/0 is provided, at the output of board CES8 on conductor $m28$, for instance, in view of its recording in memory MTS2/7, for instance, via multiplexer ML2/7. Simultaneously, the coded combination originating from memory MTE1/7 is provided, at the output of board CES1 on conductor $m641$, for instance, in view of its recording in memory MTS64/7, for instance, via multiplexer ML64/7.

So it is and simultaneously for each coded combination provided in series for each of the 512 incoming memories MTE1/0 to MTE64/7 which is recorded in one of the 512 outgoing memories MTS1/0 to MTS64/7.

This network which can be likened with a four space stage network included between two time stages, offers the advantage of enabling extensions without any modification of the existing wiring. Moreover, the modular design of the space stage made up of eight boards identical with board CES of FIG. 4, is very reliable, several substitute boards being provided.

It is clearly understood that the preceding descriptions are made only by way of unrestrictive example and that numerous alternatives may be considered, without departing from the scope of the invention. More particularly, the numerical details have been given only to make the description easier and may vary with each case of application.

We claim:

1. A switching network for providing communication from a time division switching stage through a space division switching stage, wherein said space division stage is configured into a plurality of crosspoint matrices, each crosspoint matrix being formed by the intersection of input conductors and output conductors, and in which each of said input conductors is represented by a multiple bit address code, and in which said matrices are grouped within a plurality of modules, with each module having a plurality of commoned output conductors, a control conductor representing each output conductor within a matrix for receiving multiple-bit addresses corresponding to the addresses of input conductors accessible to said matrix, an address register for each said control conductor for storing said multiple bit addresses, a demultiplexer common to a plurality of said modules for receiving clock addressing signals, said demultiplexer forwarding said addressing signals to registers in a sequence, the registers of said groups being serially disposed relative to said demultiplexer for receiving addressing signals and switching enabling signals therefrom for switching a crosspoint responsive to the correlation of the multiple bit input address codes and the clocked addressing signals for an enabled module.

2. A network as claimed in claim 1, wherein said space division stage comprises a first and a second grouping of modules, with a path through said space division stage comprising a crosspoint in said first grouping of modules cascaded with a crosspoint in said second grouping, and including a common demultiplexer for said first grouping, and a demultiplexer for said second grouping.

3. A network as claimed in claim 2, wherein each said register includes a receiving register and a buffer register with said receiving register receptive of said multiple bit addresses for transmission to its buffer register responsive to signals received from the demultiplexer for the module of said register.

4. A network as claimed in claim 3, wherein each said buffer register is receptive of a stored address from said receiving register on receipt of a timing address signal for switching the crosspoint of an input corresponding to the stored address.

* * * * *